United States Patent
Yamauchi

(10) Patent No.: US 10,909,434 B2
(45) Date of Patent: Feb. 2, 2021

(54) PASSIVE RFID TAG AND RFID SYSTEM

(71) Applicant: LAPIS Semiconductor Co., Ltd., Yokohama (JP)

(72) Inventor: Shigeki Yamauchi, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/825,680

(22) Filed: Mar. 20, 2020

(65) Prior Publication Data

US 2020/0311506 A1  Oct. 1, 2020

(30) Foreign Application Priority Data

Mar. 29, 2019 (JP) .................................. 2019-066615

(51) Int. Cl.
*G06K 19/07* (2006.01)

(52) U.S. Cl.
CPC ..... *G06K 19/0709* (2013.01); *G06K 19/0723* (2013.01)

(58) Field of Classification Search
CPC .................................................. H02J 7/00302
See application file for complete search history.

(56) References Cited

U.S. PATENT DOCUMENTS

| | | | | |
|---|---|---|---|---|
| 2011/0156640 A1* | 6/2011 | Moshfeghi | .............. | H02J 50/80 320/108 |
| 2014/0111032 A1* | 4/2014 | Shearer | .............. | G06K 19/0707 307/149 |
| 2018/0069486 A1* | 3/2018 | Ouda | ................... | H04B 5/0037 |
| 2018/0190055 A1* | 7/2018 | Kim | ................... | G07C 9/00174 |

FOREIGN PATENT DOCUMENTS

JP    2007-122600 A    5/2007

* cited by examiner

*Primary Examiner* — Joseph H Feild
*Assistant Examiner* — Pameshanand Mahase
(74) *Attorney, Agent, or Firm* — Rabin & Berdo, P.C.

(57) ABSTRACT

A passive radio frequency identification (RFID) tag includes: a rectifier circuit that rectifies a signal obtained from an antenna and outputs the rectified signal as a DC voltage. A capacitor is connected to an output line of the rectifier circuit. A first regulator circuit generates a first regulator voltage by stabilizing the output DC voltage from the rectifier circuit. A control circuit starts operating when the first regulator voltage is applied, and the control circuit generates a control signal upon receipt of the modulation signal section of the wireless signal. A second regulator circuit generates a second regulator voltage by stabilizing the output DC voltage from the rectifier circuit in response to the control signal and outputs the second regulator voltage to the outside.

9 Claims, 5 Drawing Sheets

PASSIVE RFID TAG AND RFID SYSTEM

TECHNICAL FIELD

The present invention relates to a passive radio frequency identification (RFID) tag that operates with radio waves transmitted from a reader/writer as the power source, and an RFID system having this passive RFID tag.

BACKGROUND ART

Passive RFIDs are a technique by which a tag on a secondary unit operates with radio waves transmitted from a reader/writer of a primary unit as a power source, and information is communicated between the reader/writer and the tag.

Conventional passive RFID tags include: a rectifier circuit that rectifies an alternating current signal that is a signal received from an antenna that receives radio waves; a regulator circuit that stabilizes an output direct current voltage from the rectifier circuit; a control circuit that operates according to an output voltage from the regulator circuit; and a demodulation/modulation circuit that is connected to the antenna, that operates using the output direct current voltage from the rectifier circuit, and that undergoes transmission/reception control by the control circuit. A conventional RFID tag having this configuration is disclosed in Japanese Patent Application Laid-Open Publication No. 2007-122600, for example.

The antenna receives a transmission radio wave from a reader/writer, and the received signal is supplied to the rectifier circuit as an alternating current signal, and converted to a direct current voltage. The direct current voltage is supplied to the regulator circuit and the demodulation/modulation circuit. The control circuit operated by the output voltage of the regulator circuit writes reception data to a memory, and reads data written to the memory and supplies the data as transmission data to the demodulation/modulation circuit. The demodulation/modulation circuit detects and demodulates the received signal and supplies the received signal to the control circuit as reception data as well as modulating transmission data that is a response supplied from the control circuit to the antenna as the transmission signal.

SUMMARY OF THE INVENTION

In recent years, usage methods have been realized in which, aside from a usage method in which a reader/writer writing information to the memory of a tag of a secondary unit or reading in the written information, an external sensor is provided on the tag, and sensor information detected by the sensor is read. However, if a sensor is provided externally, external circuits such as a sensor circuit are operated by the output voltage from the regulator circuit, and thus, the power consumption of the tag increases. As a result, it is difficult to ensure sufficient power for a tag that relies on received radio waves as the power source, and the demodulation/modulation circuit cannot output a high intensity transmission signal to be read by the reader/writer, resulting in the communication distance between the reader/writer and the tag being shortened.

An object of the present invention is to provide a passive RFID tag and an RFID system by which it is possible to ensure sufficient power, even if an externally connected circuit is provided.

A passive RFID tag according to the present invention is configured to receive, through an antenna, a wireless signal that is transmitted from a reader/writer, and includes a non-modulation signal section and a modulation signal section that immediately follows the non-modulation signal section, the passive RFID tag including: a rectifier circuit that is connected to the antenna, and that is configured to rectify a reception signal obtained from the antenna by reception of the wireless signal and output the rectified reception signal as a direct current voltage to a power source line; a capacitor that is connected to the power source line, and to which the direct current voltage is applied; a demodulation/modulation circuit that is connected to the power source line, and that is configured to detect and demodulate the reception signal upon application thereto of the direct current voltage to obtain reception data, as well as to modulate transmission data and supply a resulting modulation signal to the antenna; a first regulator circuit that is connected to the power source line, and that is configured to perform an operation of generating a first regulator voltage by stabilizing the direct current voltage; a control circuit that is configured to start operating by application thereto of the first regulator voltage as a result of generation of the first regulator voltage by the first regulator circuit, and to generate a control signal upon receipt of the modulation signal section; and a second regulator circuit that is connected to the power source line, that is configured to perform an operation of generating a second regulator voltage by stabilizing the direct current voltage in response to the control signal, and outputting the second regulator voltage to outside.

In the passive RFID tag according to the present invention, the control circuit is configured to generate an enable signal as the control signal when the demodulation/modulation circuit obtains the reception data indicating an ON command, and the second regulator circuit is configured to start an operation of generating the second regulator voltage in response to the enable signal.

Also, the passive RFID tag according to the present invention further includes: a timer circuit that is connected to the power source line, and that is configured to measure a prescribed timer period when the voltage of the power source line reaches the prescribed direct current voltage, wherein the timer circuit is configured to generate a first enable signal after measuring the prescribed timer period, wherein the first regulator circuit is configured to start an operation of generating the first regulator voltage in response to the first enable signal, wherein the control circuit is configured to generate a second enable signal as the control signal by application thereto of the first regulator voltage as a result of generation of the first regulator voltage by the first regulator circuit, and wherein the second regulator circuit is configured to start an operation of generating the second regulator voltage in response to the second enable signal.

An RFID system according to the present invention includes: a reader/writer that is configured to transmit a wireless signal that includes a non-modulation signal section and a modulation signal section that immediately follows the non-modulation signal section; and a passive RFID tag that is configured to receive, through an antenna, the wireless signal that is transmitted from the reader/writer, wherein the passive RFID tag a rectifier circuit that is connected to the antenna, and that is configured to rectify a reception signal obtained from the antenna by reception of the wireless signal and output the rectified reception signal as a direct current voltage to a power source line; a capacitor that is connected to the power source line, and to which the direct current voltage is applied; a demodulation/modulation circuit that is connected to the power source line, and that is configured to detect and demodulate the reception signal upon application thereto of the direct current voltage to obtain reception data, as well as to modulate transmission data and supply a resulting modulation signal to the antenna; a first regulator circuit that is connected to the power source line, and that is configured to perform an operation of generating a first regulator voltage by stabilizing the direct current voltage; a control circuit that is configured to start operating by application thereto of the first regulator voltage as a result of generation of the first regulator voltage by the first regulator circuit, and to generate a control signal upon receipt of the modulation signal section; and a second regulator circuit that is connected to the power source line, that is configured to perform an operation of generating a second regulator voltage by stabilizing the direct current voltage in response to the control signal, and outputting the second regulator voltage to outside. includes:

According to the passive RFID tag and the RFID system of the present invention, when providing an external connecting circuit, charge accumulates in the capacitor as a result of the output direct current voltage from the rectifier circuit when receiving the non-modulation signal section of the wireless signal, and when receiving the non-modulation signal section of the wireless signal, the second regulator circuit outputs the second regulator voltage to the external connecting circuit, and in this case, the charge accumulated in the capacitor is discharged, thus allowing for more than sufficient power supply to the external connecting circuit.

DETAILED DESCRIPTION OF EMBODIMENTS

Embodiments of the present invention will be explained in detail below with reference to the drawings.

Figure 1:
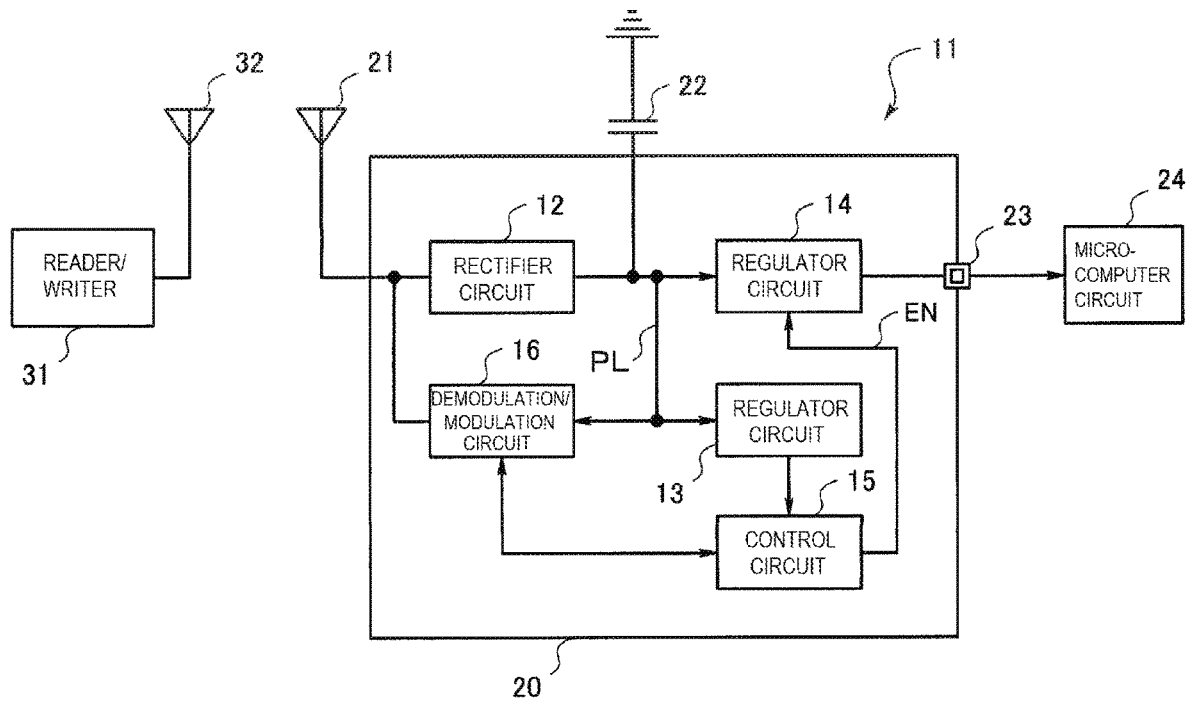
FIG. 1 shows an RFID system having a passive RFID tag as Embodiment 1 of the present invention.

FIG. 1 shows a circuit configuration of a passive radio frequency identification (RFID) tag 11 to which the present invention is applied as Embodiment 1. The passive RFID tag 11 includes a rectifier circuit 12, regulator circuits 13 and 14, a control circuit 15, and a demodulation/modulation circuit 16. The rectifier circuit 12 is connected to an antenna 21. The antenna 21 receives a wireless signal that is a radio wave transmitted from an antenna 32 of a reader/writer 31, and supplies the wireless signal to the rectifier circuit 12 as a received signal. The rectifier circuit 12 rectifies the received signal, which is the supplied alternating current signal, and outputs the signal as a direct current voltage. The direct current voltage output terminal of the rectifier circuit 12 is connected through a power source line PL to the regulator circuits 13 and 14 and the demodulation/modulation circuit 16, and the output direct current voltage of the rectifier circuit 12 is supplied to the regulator circuits 13 and 14 and the demodulation/modulation circuit 16.

A capacitor 22 is connected to the power source line PL, which connects the direct current voltage output terminal of the rectifier circuit 12 to the regulator circuits 13 and 14 and the demodulation/modulation circuit 16. The capacitor 22 is connected between the power source line PL and ground, and is attached externally to an IC chip 20 that constitutes the tag 11. Charge accumulates in the capacitor 22 as a result of the output direct current voltage from the rectifier circuit 12 being applied thereto.

The regulator circuit 13 is a first regulator circuit that stabilizes the output direct current voltage from the rectifier circuit 12 to a predetermined regulator voltage and outputs the regulator voltage to the control circuit 15.

The regulator circuit 14 is a second regulator circuit that, similar to the regulator circuit 13, stabilizes the output direct current voltage from the rectifier circuit 12 to a predetermined regulator voltage and outputs the regulator voltage to an external connection terminal 23. The external connection terminal 23 has connected thereto a microcomputer circuit 24 as shown in FIG. 1, for example. The microcomputer circuit 24 is constituted of a computer, and operates using the regulator voltage outputted from the external connection terminal 23 as a power source voltage.

The control circuit 15 is connected to the regulator circuit 13 as well as to the regulator circuit 14 and the demodulation/modulation circuit 16. The control circuit 15 operates using the regulator voltage outputted from the regulator circuit 13 as a power source voltage. In embodiments of the invention, the control circuit 15 may include one or more processors and memory, as well as supporting logic circuits to enable the control circuit 15 to generate control signals, discussed below, based on determining characteristics of an input signal.

The demodulation/modulation circuit 16 is connected to the antenna 21 and operates using the output direct current voltage from the rectifier circuit 12 as a power source voltage. The demodulation/modulation circuit 16 detects and demodulates the received signal supplied from the antenna 21 and supplies the received signal to the control circuit as reception data as well as modulating transmission data that is a response supplied from the control circuit 15 to the antenna 21 as the transmission signal. The demodulation/modulation circuit 16 may include any appropriate circuit, such as a phase-locked loop (PLL) type circuit or other digital signal processor, for obtaining data and modulating a carrier wave with the data, or for receiving the modulated signal and extracting the data from the modulated signal.

The regulator voltages of the regulator circuits 13 and 14 may be the same voltage or differing voltages, and are set by the operating voltages of the control circuit 15 and the microcomputer circuit 24.

The control circuit 15 obtains reception data from the demodulation/modulation circuit 16 and generates transmission data as a response according to a command included in the reception data. Also, the control circuit 15 outputs an enable signal EN to the regulator circuit 14 according to the command in the reception data received from the demodulation/modulation circuit 16. The regulator circuit 14 executes a voltage stabilization operation over the period during which the enable signal EN is supplied from the control circuit 15.

Next, the operation of the passive RFID tag 11 according to the stated configuration will be described according to the operation waveform chart of FIG. 2.

Figure 2:
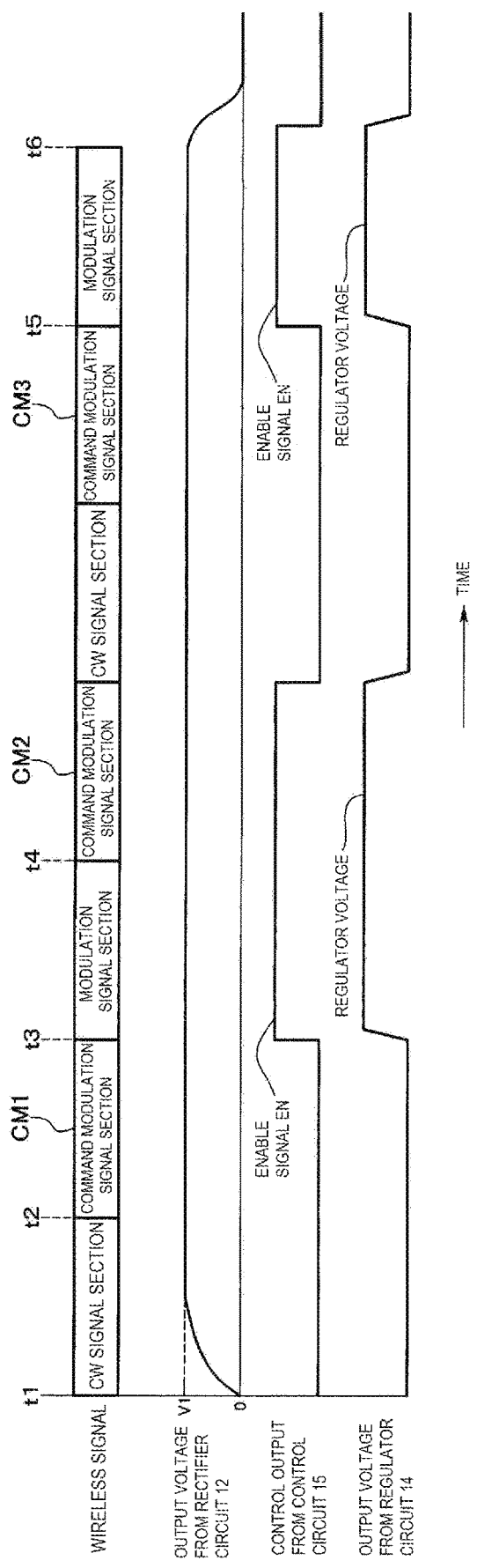
FIG. 2 is a waveform chart showing an operation of the passive RFID tag of FIG. 1.

The wireless signal transmitted from the antenna 32 of the reader/writer 31 includes a continuous wave (CW) signal section, a command modulation signal section, and a modulation signal section as shown in FIG. 2. The CW signal section is an unmodulated continuous wave, or in other words, the section for only the carrier signal, and is the portion indicating the preamble of the command. The command modulation signal section is a section for a signal obtained by modulating the carrier using a bit array representing the command. The modulation signal section is a section in which the signal obtained by modulating the carrier using a bit array representing another command or a parameter continues. Alternatively, the modulation signal section may be a signal obtained by modulation using a specific bit array that does not represent a command or a parameter. In the wireless signal shown in FIG. 2, the command modulation signal sections CM1 and CM3 include an ON command for the enable signal EN, and the command modulation signal section CM2 includes an OFF command for the enable signal EN.

When the CW signal section of the wireless signal is received by the antenna 21 at a time t1 as shown in FIG. 2, the received signal is supplied to the rectifier circuit 12 and rectified therein to form a direct current voltage. As shown in FIG. 2, after the CW signal section is received, the output direct current (DC) voltage from the rectifier circuit 12 gradually rises while charging the capacitor 22, and reaches a substantially uniform DC voltage V1. This DC voltage V1 is supplied to the regulator circuit 13 and the demodulation/modulation circuit 16, and activates the regulator circuit 13 and the demodulation/modulation circuit 16. The DC voltage is stabilized by the regulator circuit 13 and the regulator voltage is generated and supplied to the control circuit 15, and the control circuit 15 operates using the regulator voltage. In other words, the passive RFID tag 11 is in a standby state by which it can handle the modulation signal section including the command modulation signal section of the wireless signal. However, the power consumption of the control circuit 15 is low during the standby state and the capacitor 22 can be sufficiently charged.

When the command modulation signal section CM1 is received by the antenna 21 at a time t2 following the reception of the CW signal section of the wireless signal, the received signal is supplied to the rectifier circuit 12 and rectified therein to form the direct current voltage, and thus, as shown in FIG. 2, the output direct current voltage of the rectifier circuit 12 continues to be the substantially constant direct current voltage V1.

Figure 3:
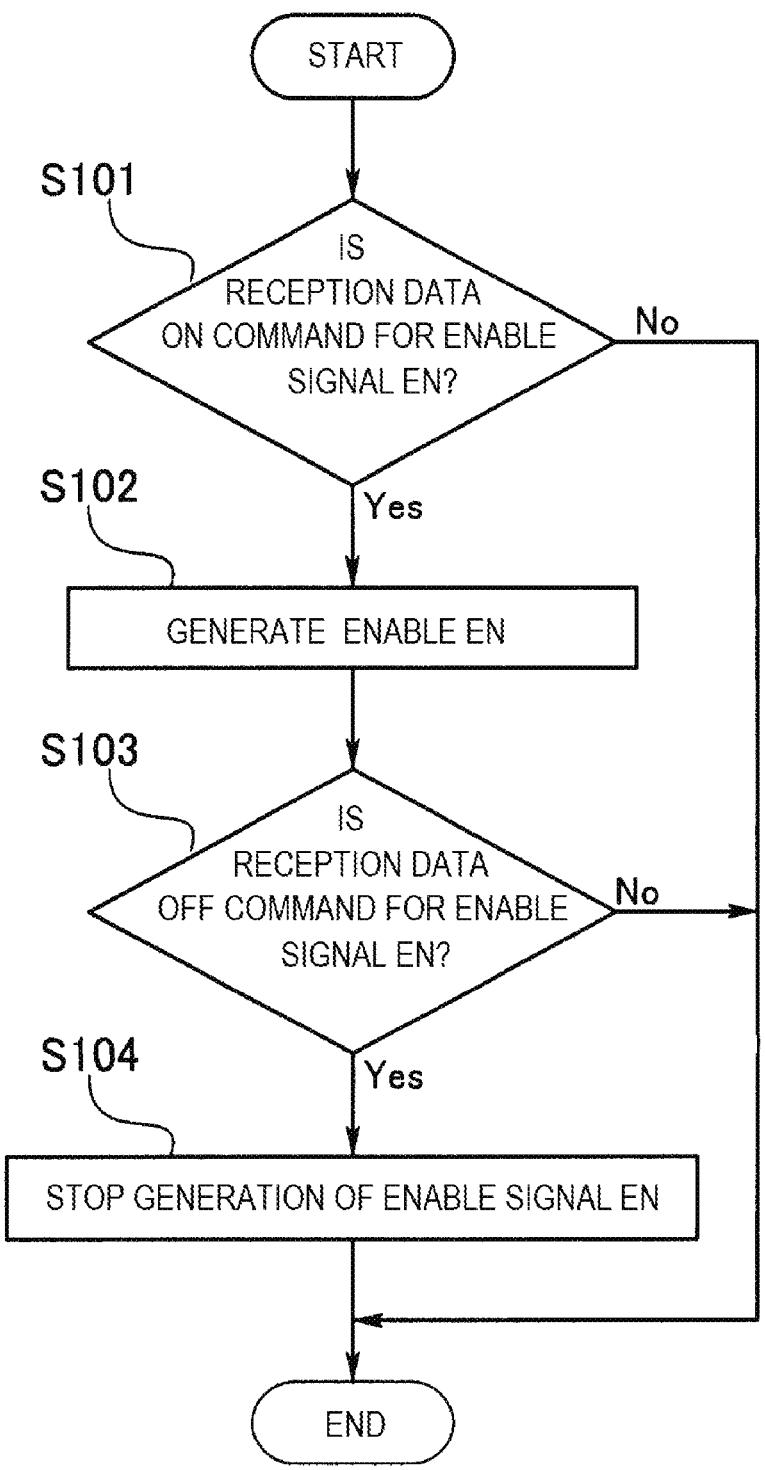
FIG. 3 is a flow chart showing an operation of a control circuit in the passive RFID tag of FIG. 1.

The command modulation signal section CM1 of the wireless signal is detected and demodulated by the demodulation/modulation circuit 16 and supplied to the control circuit as reception data. As shown in FIG. 2, the command modulation signal section CM1 includes the ON command for the enable signal EN, and thus, reception data indicating the ON command for the enable signal EN is supplied to the control circuit 15. As shown in FIG. 3, upon receiving the reception data, the control circuit 15 determines whether or not the reception data is an ON command for the enable signal EN (step S101). If the reception data is the ON command for the enable signal EN, then the enable signal EN is generated as shown in FIG. 2 (step S102). The enable signal EN is supplied to the regulator circuit 14 and causes the regulator circuit 14 to operate. The regulator circuit 14 receives the output DC voltage from the rectifier circuit 12 and stabilizes the DC voltage, thereby generating the regulator voltage as shown in FIG. 2. The regulator voltage is supplied through the external connection terminal 23 to the microcomputer circuit 24, and thus, the microcomputer circuit 24 is started up by the regulator voltage.

When the modulation signal section is received by the antenna 21 at a time t3 following the reception of the command modulation signal section CM1 of the wireless signal, the received signal is supplied to the rectifier circuit 12 and rectified therein to form the DC voltage, and thus, as shown in FIG. 2, the output DC voltage of the rectifier circuit 12 continues to be the substantially constant DC voltage V1. The command is not included in the reception data obtained from the demodulation/modulation circuit 16, and thus, the control circuit 15 continues generation of the enable signal EN. As a result, the regulator circuit 14 continues supplying the regulator voltage through the external connection terminal 23 to the microcomputer circuit 24, and thus, the microcomputer circuit 24 continues to operate using the regulator voltage.

When the command modulation signal section CM2 is received by the antenna 21 at a time t4 following the reception of the modulation signal section of the wireless signal, the received signal is supplied to the rectifier circuit 12 and rectified therein to form the DC voltage, and thus, as shown in FIG. 2, the output DC voltage of the rectifier circuit 12 continues to be the substantially constant DC voltage V1.

The command modulation signal section CM2 of the wireless signal is detected and demodulated by the demodulation/modulation circuit 16 and supplied to the control circuit as reception data. As shown in FIG. 2, the command modulation signal section CM2 includes the OFF command for the enable signal EN, and thus, reception data indicating the OFF command for the enable signal EN is supplied to the control circuit 15. As shown in FIG. 3, after execution of step S102, upon receiving the reception data, the control circuit 15 determines whether or not the reception data is an OFF command for the enable signal EN (step S103). If the reception data is the OFF command for the enable signal EN, then generation of the enable signal EN is stopped as shown in FIG. 2 (step S104). The supply of the enable signal EN to the regulator circuit 14 is stopped, thereby causing the regulator circuit 14 to stop generating the regulator voltage. As a result, supply of the regulator circuit to the microcomputer circuit 24 from the regulator circuit 14 is stopped, causing the microcomputer circuit 24 to stop operating.

If no wireless signal is received after the modulation signal section of the wireless signal, then as shown in FIG. 2, if, for example, a modulation signal section arrives at a time t5 after reception of the command modulation signal section CM3 indicating the ON command for the enable signal EN and the wireless signal is stopped at a time t6 thereafter, the passive RFID tag 11 stops operating. Specifically, as long as the modulation signal section is being received, the rectifier circuit 12 outputs the DC voltage. As a result, the control circuit 15 continues generating the enable signal EN, and the regulator circuit 14 continues supplying the regulator voltage through the external connection terminal 23 to the microcomputer circuit 24. However, if reception of the modulation signal section ends and the wireless signal itself ceases, then the rectifier circuit 12 no longer outputs the DC voltage, and thus, after the time t6, the output DC voltage from the rectifier circuit 12 is gradually reduced as shown in FIG. 2 as the accumulated charge from the capacitor 22 is discharged. As a result, as shown in FIG. 2, the control circuit 15 stops generating the enable signal EN, and as shown in FIG. 2, the regulator circuit 14 stops generating the regulator voltage, and thus, the microcomputer circuit 24 stops operating.

Thus, in Embodiment 1, during the period in which the ON command for the enable signal EN is being received and the enable signal EN is being supplied by the control circuit 15 to the regulator circuit 14, it is possible to operate the external microcomputer circuit 24 in addition to operating the various circuits within the passive RFID tag 11. In this case, the charge accumulated in the capacitor 22 is discharged, allowing for more than sufficient power supply. Thus, communication between the reader/writer 31 and the passive RFID tag 11 can be achieved for a longer period of time than in conventional configurations, without a loss of power. Also, during operation of the microcomputer circuit 24, the charge accumulated in the capacitor 22 is discharged, and thus, even if received power is temporarily reduced due to an obstacle between the reader/writer 31 and the passive RFID tag 11, the accumulated charge in the capacitor 22 can compensate for the reduced power being received.

During operation of the microcomputer circuit 24, sensor measurements can be obtained by sensors such as a temperature sensor, the measurement data can be supplied to the control circuit 15, and the control circuit 15 can store the measurement data in a memory (not shown). The reader/writer 31 transmits a read command for the sensor measurement at an appropriate timing through a wireless signal transmitted through the antenna 32 to the passive RFID tag 11. In the passive RFID tag 11, when the control circuit 15 recognizes the read command for the sensor measurement in the reception data obtained by the demodulation/modulation circuit 16 through the antenna 21, the sensor measurement is read from the memory, the control circuit 15 creates transmission data including the sensor measurement as a response, and the demodulation/modulation circuit 16 modulates the transmission data supplied from the control circuit 15 as the response and supplies the modulated transmission data to the antenna 21 as the transmission signal. Thus, it is possible for the reader/writer 31 to obtain sensor measurements by receiving the transmission signal through the antenna 32.

With the reader/writer 31, it is possible to ascertain the approximate distance between the reader/writer 31 and the passive RFID tag 11 through the modulation signal level returned from the passive RFID tag 11. Also, if the reader/writer 31 accesses the same RFID tag 11 a plurality of times, or if access is performed over a plurality of times while detecting the returned modulation signal level, then the data collection time can be optimized by managing the ON/OFF time of the start-up command of the second regulator circuit 14 on the basis of the charge time calculated according to the ascertained distance.

Figure 4:
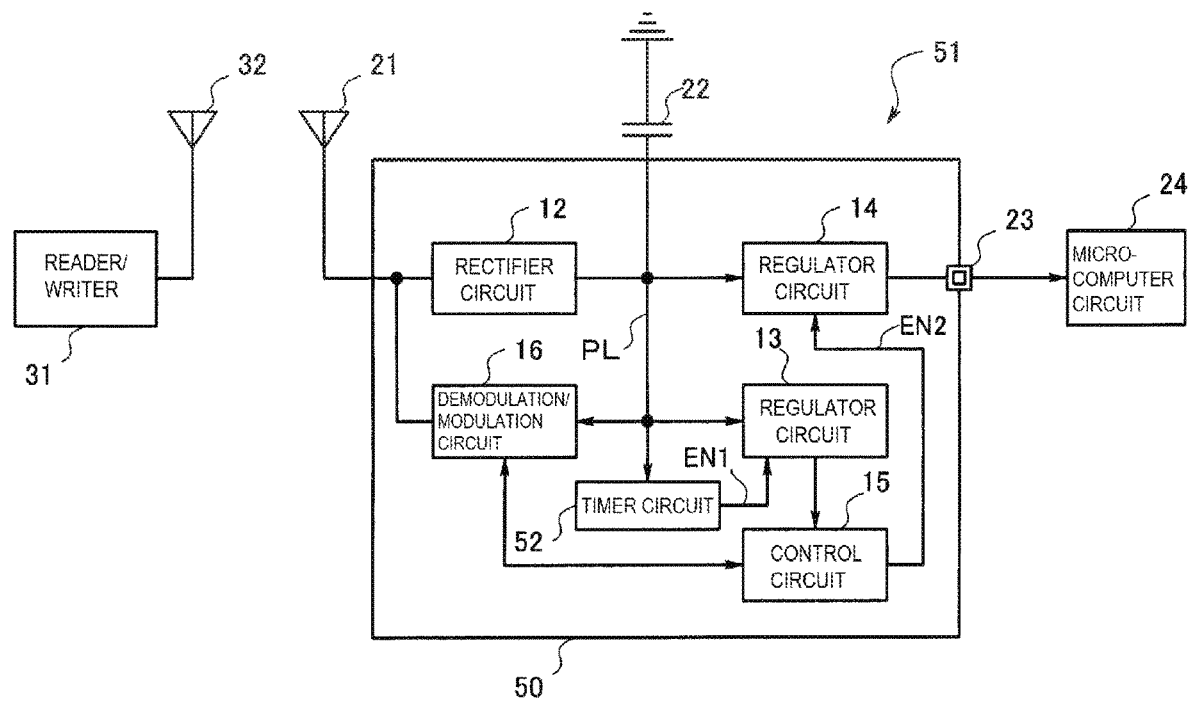
FIG. 4 shows an RFID system having a passive RFID tag as Embodiment 2 of the present invention.

FIG. 4 shows a circuit configuration of a passive RFID tag 51 to which the present invention is applied as Embodiment 2. In this passive RFID tag 51, components that are the same as those of Embodiment 1 are assigned the same reference characters. Aside from the fact that the regulator circuits 13 and 14 are operated by the supply of enable signals EN1 and EN2, the rectifier circuit 12, the regulator circuits 13 and 14, the control circuit 15, the demodulation/modulation circuit 16, and the capacitor 22 are similar to those of the tag 11 of Embodiment 1. The capacitor 22 is attached externally to an IC chip 50 that constitutes the tag 51. The passive RFID tag 51 further has a timer circuit 52. The timer circuit 52 is connected to the DC voltage output terminal of the rectifier circuit 12, or in other words, to the power source line PL, and measures a prescribed timer period from the time at which the DC voltage from the rectifier circuit 12 reaches V1. The timer circuit 52 generates the enable signal EN1 as of when measurement during the prescribed timer period ends, and supplies the enable signal EN1 to the regulator circuit 13. The prescribed timer period corresponds to the time from when the DC voltage reaches V1 to when the wireless signal transitions from the CW signal section to the modulation signal section, or immediately prior to transitioning to the modulation signal section.

The control circuit 15 operates with the regulator voltage outputted from the regulator circuit 13 as a power source voltage, generates the enable signal EN2 after a prescribed delay time elapses from the start of the operation, and supplies the enable signal EN2 to the regulator circuit 14. The prescribed delay time may be a delay from when the regulator voltage is received to when operation of the control circuit 15 stabilizes.

Other components are similar to those of Embodiment 1, and therefore, and descriptions thereof are omitted here.

Next, the operation of the passive RFID tag 51 of Embodiment 2 according to the stated configuration will be described according to the operation waveform chart of FIG. 5.

Figure 5:
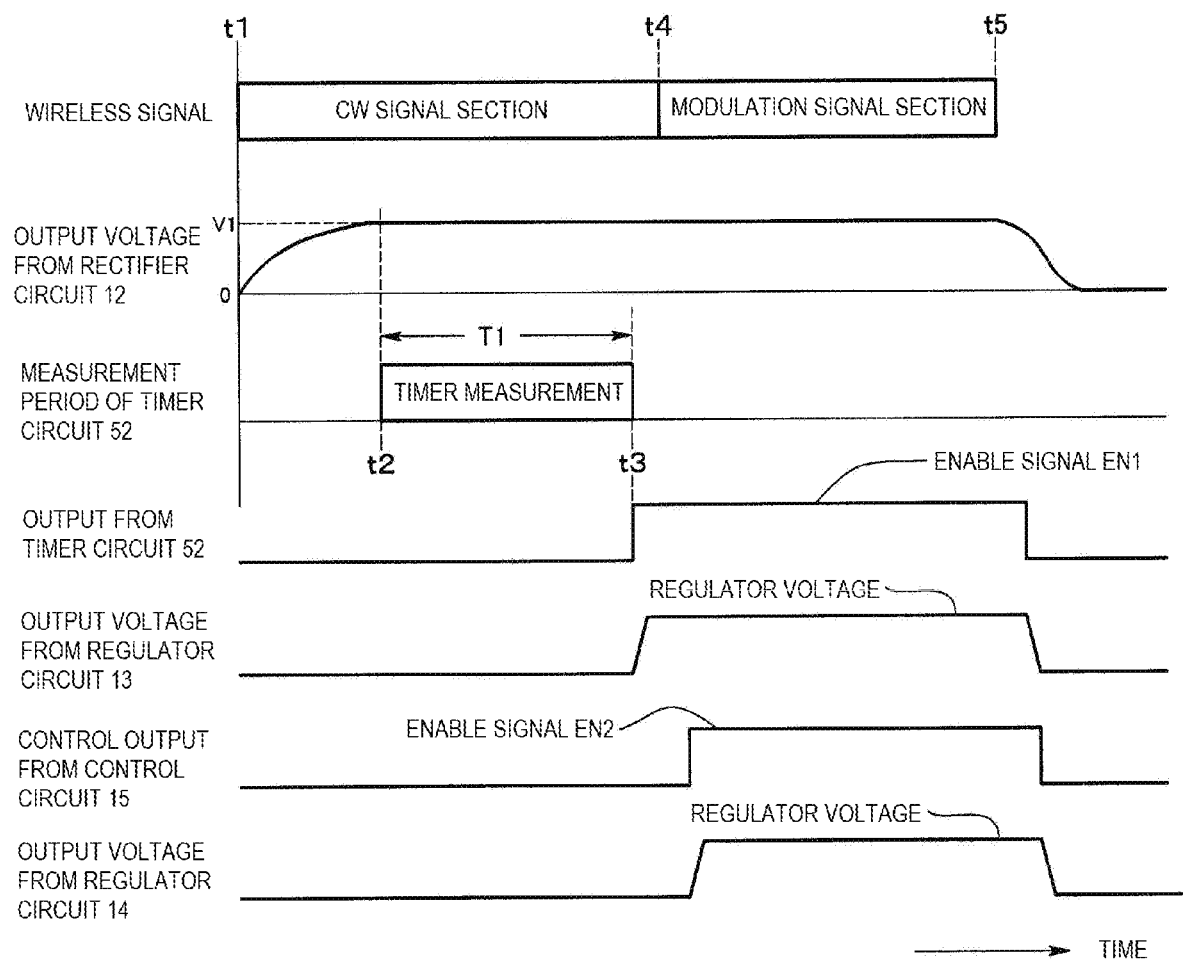
FIG. 5 is a waveform chart showing an operation of the passive RFID tag of FIG. 4.

The wireless signal transmitted from the antenna 32 of the reader/writer 31 includes a CW signal section and a modulation signal section as shown in FIG. 5. The CW signal section is an unmodulated continuous wave, or in other words, the section for only the carrier signal, and is the portion indicating the preamble of the command. The length of the CW signal section is constant. The modulation signal section is a section in which the signal obtained by modulating the carrier using a bit array representing a command or a parameter continues. Alternatively, the modulation signal section may be a signal obtained by modulation using a specific bit array that does not represent a command or a parameter.

When the CW signal section of the wireless signal is received by the antenna 21 at a time t1 as shown in FIG. 5, the received signal is supplied to the rectifier circuit 12 and rectified therein to form a DC voltage. As shown in FIG. 5, after the CW signal section is received, the output DC voltage from the rectifier circuit 12 gradually rises while charging the capacitor 22, and reaches a substantially uniform DC voltage V1. The DC voltage V1 is supplied to the timer circuit 52, and as shown in FIG. 5, the timer circuit 52 starts measurement for the prescribed timer period T1 at a time t2. During measurement performed during the timer period T1, the regulator circuit 13 and the control circuit 15 do not operate, and thus, it is possible to charge the capacitor 22 even faster.

As shown in FIG. 5, the timer circuit 52 generates the enable signal EN1 as of when measurement during the prescribed timer period T1 is ended at a time t3, and supplies the enable signal EN1 to the regulator circuit 13. The time t3 is a time immediately prior to a time t4 when the wireless signal transitions from the CW signal section to the modulation signal section.

The output DC voltage V1 from the rectifier circuit 12 is stabilized by the regulator circuit 13 in response to the enable signal EN1, and as shown in FIG. 5, the regulator voltage is generated and supplied to the control circuit 15. The control circuit 15 is started up by the regulator voltage.

When the control circuit 15 starts operating, then as shown in FIG. 5, the enable signal EN2 is generated after a prescribed delay time has elapsed from the start of operation. The enable signal EN2 is supplied to the regulator circuit 14, and causes the regulator circuit 14 to operate. The regulator circuit 14 receives the output DC voltage from the rectifier circuit 12 and stabilizes the DC voltage, thereby generating the regulator voltage as shown in FIG. 5. The regulator voltage is supplied through the external connection terminal 23 to the microcomputer circuit 24, and thus, the microcomputer circuit 24 is started up by the regulator voltage. During the period when the modulation signal section of the wireless signal is arriving, the regulator circuit 14 continues supplying the regulator voltage through the external connection terminal 23 to the microcomputer circuit 24, and thus, the microcomputer circuit 24 continues to operate by the regulator voltage.

However, if reception of the modulation signal section ends and the wireless signal itself ceases during a time t5, then the rectifier circuit 12 no longer outputs the DC voltage, and thus, the output DC voltage from the rectifier circuit 12 is gradually reduced as shown in FIG. 5 as the accumulated charge from the capacitor 22 is discharged. As a result, generation of the regulator voltage from the regulator circuits 13 and 14 is stopped, causing the microcomputer circuit 24 to stop operating.

Thus, in Embodiment 2, while receiving the CW signal section of the wireless signal, the capacitor 22 is sufficiently charged, both the regulator circuit 13 and the control circuit 15 are started up immediately before the start of the modulation signal section of the wireless signal, the enable signal EN2 is supplied from the control circuit 15 to the regulator circuit 14, and the regulator voltage is supplied from the regulator circuit 14 to the microcomputer circuit 24. Thus, during the period in which the regulator voltage is being supplied from the regulator circuit 14 to the microcomputer circuit 24, it is possible to operate the external microcomputer circuit 24 in addition to operating the various circuits within the passive RFID tag 51. In this case, the charge accumulated in the capacitor 22 is discharged, allowing for more than sufficient power supply to the external microcomputer circuit 24. Thus, communication between the reader/writer 31 and the passive RFID tag 51 can be achieved for a longer period of time than in conventional configurations, without a loss of power. Also, during operation of the microcomputer circuit 24, the charge accumulated in the capacitor 22 is discharged, and thus, even if received power is temporarily reduced due to an obstacle between the reader/writer 31 and the passive RFID tag 51, the accumulated charge in the capacitor 22 can compensate for the reduced power being received.

Like Embodiment 1, in Embodiment 2, during operation of the microcomputer circuit 24, sensor measurements can be obtained by sensors such as a temperature sensor, the measurement data can be supplied to the control circuit 15, and the control circuit 15 can store the measurement data in a memory (not shown). The reader/writer 31 transmits a read command for the sensor measurement at an appropriate timing through a wireless signal transmitted through the antenna 32 to the passive RFID tag 11. In the passive RFID tag 11, when the control circuit 15 recognizes the read command for the sensor measurement in the reception data obtained by the demodulation/modulation circuit 16 through the antenna 21, the sensor measurement is read from the memory, the control circuit 15 creates transmission data including the sensor measurement as a response, and the demodulation/modulation circuit 16 modulates the transmission data supplied from the control circuit 15 as the response and supplies the modulated transmission data to the antenna 21 as the transmission signal. Thus, it is possible for the reader/writer 31 to obtain sensor measurements by receiving the transmission signal through the antenna 32.

In Embodiment 2, the timer circuit 52 that measures the prescribed timer period T1 is provided, but alternatively, a configuration may be adopted in which a voltage detector (or a voltage comparator) is provided so as to detect when the output DC voltage from the rectifier circuit 12 has reached a prescribed voltage, and the first regulator circuit 13 is operated.

In Embodiments 1 and 2, the example of the passive RFID tag was described, but a configuration can be adopted in which an external power source is provided in the tag, and power from the external power source is used only when the tag is accessed by the reader/writer 31. By using such a configuration, power consumption during the standby period can be reduced, thereby enabling low power consumption.

What is claimed is:

1. A passive radio frequency identification (RFID) tag, comprising:
   a rectifier circuit connected to an antenna and configured to rectify a reception signal obtained from the antenna based on the antenna receiving a wireless signal, the rectifier circuit further configured to output a rectified reception signal as a direct current (DC) voltage to a power source line;
   a capacitor connected to the power source line, so as to have the DC voltage applied to the capacitor;
   a demodulation/modulation circuit connected to the power source line and configured to detect and demodulate the reception signal upon application thereto of the DC voltage to obtain reception data, and further configured to modulate transmission data and supply a resulting modulation signal to the antenna;
   a first regulator circuit connected to the power source line and configured to generate a first regulator voltage by stabilizing the DC voltage;
   a control circuit configured to begin operating based on receiving the first regulator voltage from the first regulator circuit, and configured to generate a control signal upon receipt of a modulation signal section of the wireless signal, the modulation signal section following a non-modulation signal section of the wireless signal; and
   a second regulator circuit connected to the power source line and configured to generate a second regulator voltage by stabilizing the DC voltage in response to the control signal, and further configured to output the second regulator voltage to outside the passive RFID tag.

2. The passive RFID tag according to claim 1,
   wherein the control circuit is configured to generate an enable signal as the control signal when the demodulation/modulation circuit obtains the reception data indicating an ON command, and
   wherein the second regulator circuit is configured to start an operation of generating the second regulator voltage in response to the enable signal.

3. The passive RFID tag according to claim 2,
   wherein the control circuit is configured to stop the enable signal as the control signal when the demodulation/modulation circuit obtains the reception data indicating an OFF command, and
   wherein the second regulator circuit is configured to stop the operation of generating the second regulator voltage in response to the stopping of the enable signal.

4. The passive RFID tag according to claim 2,
   wherein the ON command is included in the modulation signal section.

5. The passive RFID tag according to claim 3,
   wherein the OFF command is included in the modulation signal section.

6. The passive RFID tag according to claim 1, further comprising:

a timer circuit that is connected to the power source line, and that is configured to measure a prescribed timer period when the voltage of the power source line reaches the prescribed DC voltage, wherein the timer circuit is configured to generate a first enable signal after measuring the prescribed timer period, and wherein the first regulator circuit is configured to start an operation of generating the first regulator voltage in response to the first enable signal.

7. The passive RFID tag according to claim 6, wherein the control circuit is configured to generate a second enable signal as the control signal based on receiving the first regulator voltage from the first regulator circuit, and wherein the second regulator circuit is configured to start an operation of generating the second regulator voltage in response to receiving the second enable signal.

8. The passive RFID tag according to claim 7, wherein the timer circuit is configured to measure the prescribed timer period upon receipt by the rectifier circuit of a first reception signal corresponding to the non-modulation signal section of the wireless signal and end measurement of the prescribed timer period immediately after receipt by the rectifier circuit of a second reception signal corresponding to the non-modulation signal section, and wherein the control circuit is configured to generate the second enable signal immediately after the rectifier circuit begins to receive a third reception signal corresponding to the modulation signal section of the wireless signal.

9. A radio frequency identification (RFID) system, comprising:

a reader/writer configured to transmit a wireless signal that includes a non-modulation signal section and a modulation signal section that immediately follows the non-modulation signal section; and a passive RFID tag configured to receive, through an antenna, the wireless signal that is transmitted from the reader/writer, wherein the passive RFID tag includes:

a rectifier circuit connected to the antenna and configured to rectify a reception signal obtained from the antenna by reception of the wireless signal and output the rectified reception signal as a DC voltage to a power source line;

a capacitor connected to the power source line, so as to have the DC voltage applied to the capacitor;

a demodulation/modulation circuit connected to the power source line and configured to detect and demodulate the reception signal upon application thereto of the DC voltage to obtain reception data, and further configured to modulate transmission data and supply a resulting modulation signal to the antenna;

a first regulator circuit connected to the power source line and configured to generate a first regulator voltage by stabilizing the DC voltage;

a control circuit configured to begin operating based on receiving the first regulator voltage from the first regulator circuit, and configured to generate a control signal upon receipt of the modulation signal section of the wireless signal; and a second regulator circuit connected to the power source line and configured to generate a second regulator voltage by stabilizing the DC voltage in response to the control signal, and further configured to output the second regulator voltage to outside the passive RFID tag.

* * * * *